United States Patent
Wang et al.

(10) Patent No.: US 11,087,621 B2
(45) Date of Patent: Aug. 10, 2021

(54) EXPRESS LANE PLANNING METHOD AND UNIT

(71) Applicant: Huawei Technologies Co., Ltd., Shenzhen (CN)

(72) Inventors: Tizheng Wang, Shenzhen (CN); Qi Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/863,428

(22) Filed: Apr. 30, 2020

(65) Prior Publication Data

US 2020/0312133 A1 Oct. 1, 2020

Related U.S. Application Data

(63) Continuation of application No. PCT/CN2018/112313, filed on Oct. 29, 2018.

(30) Foreign Application Priority Data

Nov. 6, 2017 (CN) .......................... 201711078455.5

(51) Int. Cl.
*G08G 1/087* (2006.01)
*G08G 1/017* (2006.01)
(Continued)

(52) U.S. Cl.
CPC ............. *G08G 1/087* (2013.01); *G08G 1/017* (2013.01); *G08G 1/08* (2013.01); *G08G 1/0965* (2013.01)

(58) Field of Classification Search
CPC ...... G08G 1/166; G08G 1/0175; G08G 1/167; G08G 1/096827; G08G 1/164; G08G 1/04;
(Continued)

(56) References Cited

U.S. PATENT DOCUMENTS 9,934,688 B2 * 4/2018 Olson ................ G06K 9/00791
10,089,876 B1 * 10/2018 Ramasamy ............ G08G 1/167
(Continued)

FOREIGN PATENT DOCUMENTS

CN 1301648 A 7/2001
CN 105070076 A 11/2015
(Continued)

*Primary Examiner* — Daniel Previl
(74) *Attorney, Agent, or Firm* — Conley Rose, P.C.

(57) ABSTRACT

An express lane planning method includes obtaining, by a traffic control unit, an express lane scheduling request, an identifier of an emergency vehicle, a moment t0 at which the emergency vehicle arrives at a first road controlled by the traffic control unit, and a moment t1 at which the emergency vehicle travels away from the first road, determining, by the traffic control unit, an express lane from at least one lane, sending, by the traffic control unit, a second indication message to a non-emergency vehicle on the first road, to instruct the non-emergency vehicle not to occupy the express lane in a time period from t0 to t1, and sending, by the traffic control unit, a first indication message to the emergency vehicle based on the identifier of the emergency vehicle, to instruct the emergency vehicle to travel on the express lane in the time period from t0 to t1.

20 Claims, 6 Drawing Sheets

(51) Int. Cl.
*G08G 1/08* (2006.01)
*G08G 1/0965* (2006.01)

(58) Field of Classification Search
CPC .... G08G 1/052; G08G 1/056; G08G 1/09626;
G08G 1/0965; G08G 1/096716; G08G
1/096833; G08G 1/16; G08G 1/0116;
G08G 1/0133; G08G 1/017; G08G 1/087;
G08G 1/093; G08G 1/096741; G08G
1/096758; G08G 1/096783; G08G 1/162;
G08G 1/08; G08G 1/096775; G08G
1/096822; G08G 1/09685; B60Q 1/52;
B60Q 1/46; B60Q 1/525; B60W 10/18;
B60W 10/20; B60W 2420/42; B60W
2420/52; B60W 2554/00; B60W 2520/10;
B60W 2520/12; B60W 2520/14; B60W
2552/00; B60W 2552/05; B60W 2552/30;
B60W 2720/10; B60W 30/00; B60W
30/08; B60W 50/14; B60W 2720/106;
B60W 2754/30; B60W 30/16; B60W
2555/20; B60W 10/00; B60W 10/184;
B60W 2050/0006; B60W 2050/146;
B60W 2510/24; B60W 2510/244; B60W
2520/16; B60W 2520/18; B60W 2530/14;
B60W 2540/26; B60W 2552/40; B60W
2555/00; B60W 2555/60; B60W 2556/50;
B60W 2556/60; B60W 30/09; B60W
30/0956; B60W 30/10; B60W 30/12;
B60W 30/143; B60W 30/181; B60W
30/18163; B60W 30/182; B60W 50/0098;
B60W 50/023; B60W 50/04; G05D
2201/0213; G05D 1/0061; G05D 1/0077;
G05D 1/0212; G05D 1/0246; G05D
1/0257; G05D 1/0268; B60K 2370/169;
B60K 28/06; B60K 31/0008; B60K
31/042; G06K 9/3258; G06K 9/344;
G06K 2209/01; G06K 2209/15; G06K
9/00791; G06K 9/00798; G06K 9/00825;
G06K 9/00845; G06Q 40/08; G06Q
50/265; G06Q 10/10; G06Q 30/02; G06T
5/002; E01F 9/50; E02D 29/05; G06F
16/213; G06F 16/29; G07C 5/06; G07C
5/0808; G07C 5/008; H04L 67/26; H04W
4/027; H04W 4/44; H04W 4/90; H04W
4/024; B60Y 2302/05; A61B 5/18; A61B
5/024; A61B 5/0816; A61B 5/11; B60R
21/00; B60T 2201/087; B60T 8/1755;
B60T 8/17557; B62D 6/00; B62D 37/04;
G01C 21/26; G01C 21/00; G01C 21/34;
G01C 21/3859; G01C 21/387; G01S
15/93; G01S 17/93
USPC ....... 340/906, 904, 918, 929, 938, 990–994,
340/995.1, 995.11, 438, 435, 464, 475,
340/488
See application file for complete search history.

(56) References Cited

U.S. PATENT DOCUMENTS

| | | | |
|---|---|---|---|
| 2010/0253594 A1* | 10/2010 | Szczerba | G08G 1/165 345/7 |
| 2010/0253597 A1* | 10/2010 | Seder | G08G 1/165 345/7 |
| 2010/0292886 A1* | 11/2010 | Szczerba | G01S 13/723 701/31.4 |
| 2014/0278052 A1 | 9/2014 | Slavin et al. | |
| 2016/0033964 A1* | 2/2016 | Sato | B60K 28/06 701/24 |
| 2017/0043718 A1* | 2/2017 | Mauro | G08G 1/056 |
| 2017/0148316 A1 | 5/2017 | Curlander et al. | |
| 2017/0276492 A1 | 9/2017 | Ramasamy | |
| 2019/0064934 A1* | 2/2019 | McQuillen | G06F 3/0216 |

FOREIGN PATENT DOCUMENTS

| | | |
|---|---|---|
| CN | 106781585 A | 5/2017 |
| CN | 107170258 A | 9/2017 |
| CN | 108062863 A | 5/2018 |
| JP | 2002245588 A | 8/2002 |
| JP | 2003331393 A | 11/2003 |

* cited by examiner

EXPRESS LANE PLANNING METHOD AND UNIT

CROSS-REFERENCE TO RELATED APPLICATIONS

This application is a continuation of International Patent Application No. PCT/CN2018/112313, filed on Oct. 29, 2018, which claims priority to Chinese Patent Application No. 201711078455.5, filed on Nov. 6, 2017, both of which are hereby incorporated by reference in their entireties.

TECHNICAL FIELD

This application relates to the field of wireless communications technologies, and in particular, to an express lane planning method and a unit.

BACKGROUND

An intelligent transportation system (ITS) is intended to establish, by integrating and using advanced information technologies, communications technologies, sensing technologies, control technologies, computer technologies, and the like, a real-time, accurate, and highly-efficient comprehensive transportation management system that plays an all-round role in a wide range. The ITS can effectively utilize transport facilities, reduce traffic load and environmental pollution, ensure traffic safety, and improve transport efficiency, and is a development direction of a future transportation system and also an important part of a smart city.

Currently, some emergency vehicles that are different from normal vehicles and that are used for special purposes exist in the ITS, such as a police car, a fire-fighting truck, an ambulance, a breakdown truck, and the like. When performing an emergency task, an emergency vehicle may not be restricted by a travel speed, a travel route, a travel direction, and a traffic light signal, and should be avoided by another vehicle and pedestrian.

In a current Internet of Vehicles, an emergency vehicle periodically broadcasts cooperative awareness message (CAM) or issues decentralized environmental notification message (DENM) during travel, to indicate that the emergency vehicle is an emergency vehicle in order to warn another vehicle to avoid the emergency vehicle.

However, in the warning notification method of the emergency vehicle, another vehicle still cannot quickly make an effective response even though the vehicle obtains a notification message. Especially, when a road is crowded, it is more impossible to ensure that another vehicle can effectively avoid the emergency vehicle in a timely manner. As a result, the emergency vehicle cannot quickly arrive at a destination, and consequently efficiency of performing an emergency task by the emergency vehicle is seriously affected.

SUMMARY

Embodiments of this application provide an express lane planning method and a unit, to reduce a travel time of an emergency vehicle, and improve execution efficiency of performing an emergency task by the emergency vehicle.

The specific technical solutions provided in the embodiments of this application are as follows.

According to a first aspect, an embodiment of this application provides an express lane planning method, and the method includes obtaining, by a traffic control unit, an express lane scheduling request, obtaining, by the traffic control unit, an identifier of an emergency vehicle, a moment t0 at which the emergency vehicle arrives at a first road controlled by the traffic control unit (this indicates that the traffic control unit receives the scheduling request before the emergency vehicle arrives at the first road), and a moment t1 at which the emergency vehicle travels away from the first road, where the first road includes at least one lane, determining, by the traffic control unit, an express lane from the at least one lane, sending, by the traffic control unit, a second indication message to a non-emergency vehicle on the first road, where the second indication message is used to instruct the non-emergency vehicle not to occupy the express lane in a time period from t0 to t1, and sending, by the traffic control unit, a first indication message to the emergency vehicle based on the identifier of the emergency vehicle, where the first indication message is used to instruct the emergency vehicle to travel on the express lane in the time period from t0 to t1.

According to a second aspect, an embodiment of this application provides a traffic control unit, and the traffic control unit includes a receiving module configured to obtain an express lane scheduling request, an obtaining module configured to obtain an identifier of an emergency vehicle, a moment t0 at which the emergency vehicle arrives at a first road controlled by the traffic control unit, and a moment t1 at which the emergency vehicle travels away from the first road, where the first road includes at least one lane, a determining module configured to determine an express lane from the at least one lane, and a sending module configured to send a second indication message to a non-emergency vehicle on the first road, where the second indication message is used to instruct the non-emergency vehicle not to occupy the express lane in a time period from t0 to t1, and further send a first indication message to the emergency vehicle based on the identifier of the emergency vehicle, where the first indication message is used to instruct the emergency vehicle to travel on the express lane in the time period from t0 to t1.

Based on the first aspect and the second aspect, in a possible design, the determining, by the traffic control unit, an express lane from the at least one lane includes, if the first road includes at least two lanes, selecting a rightmost lane as the express lane, or selecting a leftmost lane as the express lane, or selecting a lane has a minimum quantity of vehicles as the express lane, or selecting a lane matching a type of the emergency vehicle as the express lane, or selecting a lane with a preset number as the express lane, or selecting a lane with a fastest vehicular traffic passing speed as the express lane.

Based on the first aspect and the second aspect, in a possible design, if the express lane includes a horizontal road intersection, the method further includes controlling, by the traffic control unit, a traffic light at the horizontal road intersection such that the traffic light indicates that a non-emergency vehicle, a non-motor vehicle, and a pedestrian are forbidden from traversing the express lane in at least the time period from t0 to t1. The traffic control unit may include a control module configured to perform the method.

Based on the first aspect and the second aspect, in a possible design, when the traffic control unit detects that the emergency vehicle travels away from the express lane, the traffic control unit further sends a third indication message to the non-emergency vehicle on the first road, to indicate that the express lane is recovered for use.

According to a third aspect, an embodiment of this application provides an express lane planning method, and the method includes receiving, by a center service unit, an express lane scheduling request, where the express lane scheduling request includes an identifier of an emergency vehicle, obtaining, by the center service unit, a speed of the emergency vehicle and an estimated travel path for the emergency vehicle to travel from a current location to a destination, obtaining, by the center service unit, a first road (the first road is a road subset of the estimated travel path) included in the estimated travel path, determining, by the center service unit, a first traffic control unit that controls the first road, determining, by the center service unit based on the speed, the estimated travel path, and the first road, a moment t0 at which the emergency vehicle arrives at the first road and a moment t1 at which the emergency vehicle travels away from the first road, and sending, by the center service unit, a scheduling indication to the first traffic control unit, where the scheduling indication includes the identifier of the emergency vehicle, t0, and t1 such that the first traffic control unit plans the first road based on the identifier of the emergency vehicle, t0, and t1.

According to a fourth aspect, an embodiment of this application provides a center service unit, and the center service unit includes a receiving module configured to receive an express lane scheduling request, where the express lane scheduling request includes an identifier of an emergency vehicle, an obtaining module configured to obtain a speed of the emergency vehicle and an estimated travel path for the emergency vehicle to travel from a current location to a destination, and further obtain a first road included in the estimated travel path, a determining module configured to determine a first traffic control unit that controls the first road, a calculation module configured to determine, based on the speed, the estimated travel path, and the first road, a moment t0 at which the emergency vehicle arrives at the first road and a moment t1 at which the emergency vehicle travels away from the first road, and a sending module configured to send a scheduling indication to the first traffic control unit, where the scheduling indication includes the identifier of the emergency vehicle, t0, and t1 such that the first traffic control unit plans the first road based on the identifier of the emergency vehicle, t0, and t1.

Based on the third aspect and the fourth aspect, in a possible design, when the estimated travel path obtained by the center service unit includes a plurality of roads, the center service unit may control a traffic light among the plurality of roads to indicate that a vehicle is allowed to pass through the plurality of roads. The center service unit may include a control module configured to perform the method.

Based on the third aspect and the fourth aspect, in a possible design, the obtaining, by the center service unit, an estimated travel path for the emergency vehicle to travel from a current location to a destination includes determining the estimated travel path based on a shortest time for the emergency vehicle to travel from the current location to the destination, determining the estimated travel path based on a minimum quantity of traffic lights passed by the emergency vehicle to travel from the current location to the destination, or determining the estimated travel path based on a least amount of vehicular traffic from the current location to the destination.

According to a fifth aspect, an embodiment of this application provides an express lane planning method, and the method includes receiving, by a center service unit, an express lane scheduling request, where the express lane scheduling request includes an identifier of an emergency vehicle, obtaining, by the center service unit, a speed of the emergency vehicle and an estimated travel channel for the emergency vehicle to travel from a current location to a destination, determining, by the center service unit based on the estimated travel channel, N traffic control units and an $i^{th}$ express lane corresponding to an $i^{th}$ traffic control unit, where the $i^{th}$ traffic control unit is one of the N traffic control units, the estimated travel channel includes the $i^{th}$ express lane, and i takes all positive integers not greater than N, determining, by the center service unit based on the speed and the estimated travel channel, a moment t2 at which the emergency vehicle arrives at the destination, and sending, by the center service unit, a scheduling indication to the $i^{th}$ traffic control unit, where the scheduling indication includes the identifier of the emergency vehicle, t2, and an identifier of the $i^{th}$ express lane such that the $i^{th}$ traffic control unit plans the $i^{th}$ express lane based on the identifier of the emergency vehicle and t2.

According to a sixth aspect, an embodiment of this application provides a center service unit, and the center service unit includes a receiving module configured to receive an express lane scheduling request, where the express lane scheduling request includes an identifier of an emergency vehicle, an obtaining module configured to obtain a speed of the emergency vehicle and an estimated travel channel for the emergency vehicle to travel from a current location to a destination, a determining module configured to determine, based on the estimated travel channel, N traffic control units and an $i^{th}$ express lane corresponding to an $i^{th}$ traffic control unit, where the $i^{th}$ traffic control unit is one of the N traffic control units, the estimated travel channel includes the $i^{th}$ express lane, and i takes all positive integers not greater than N, a calculation module configured to determine, based on the speed and the estimated travel channel, a moment t2 at which the emergency vehicle arrives at the destination, and a sending module configured to send a scheduling indication to the $i^{th}$ traffic control unit, where the scheduling indication includes the identifier of the emergency vehicle, t2, and an identifier of the $i^{th}$ express lane such that the $i^{th}$ traffic control unit plans the $i^{th}$ express lane based on the identifier of the emergency vehicle and t2.

According to a seventh aspect, an embodiment of this application provides an express lane planning method, and the method includes receiving, by a traffic control unit, an express lane scheduling request, obtaining, by the traffic control unit, an identifier of an emergency vehicle, a moment t2 at which the emergency vehicle arrives at a destination, and an express lane identifier, where the express lane identifier is used to indicate which lane is an express lane on a first road controlled by the traffic control unit, determining, by the traffic control unit, the express lane based on the express lane identifier, sending, by the traffic control unit, a second indication message to a non-emergency vehicle on the first road, where the second indication message is used to instruct the non-emergency vehicle not to occupy the express lane before the moment t2, and sending, by the traffic control unit, a first indication message to the emergency vehicle based on the identifier of the emergency vehicle, where the first indication message is used to indicate that the emergency vehicle can travel on the express lane before the moment t2.

According to an eighth aspect, an embodiment of this application provides a traffic control unit, and the traffic control unit includes a receiving module configured to receive an express lane scheduling request, an obtaining module configured to obtain an identifier of an emergency vehicle, a moment t2 at which the emergency vehicle arrives at a destination, and an express lane identifier, where the express lane identifier is used to indicate which lane is an express lane on a first road controlled by the traffic control unit, a determining module configured to determine the express lane based on the express lane identifier, a sending module configured to send a second indication message to a non-emergency vehicle on the first road, where the second indication message is used to instruct the non-emergency vehicle not to occupy the express lane before the moment t2, and send a first indication message to the emergency vehicle based on the identifier of the emergency vehicle, where the first indication message is used to indicate that the emergency vehicle can travel on the express lane before the moment t2.

Based on the seventh aspect and the eighth aspect, in a possible design, when the traffic control unit detects that the emergency vehicle travels away from the first road, the traffic control unit further sends a third indication message to the non-emergency vehicle on the first road, where the third indication message is used to indicate that the express lane on the first road is recovered for use.

According to a ninth aspect, an embodiment of this application provides a device. The device includes a processor, a memory, a transceiver, and a bus. The processor, the memory, and the transceiver are connected to each other by the bus. The memory stores a program instruction. The transceiver is configured to receive and send information. The processor is configured to invoke the program instruction in the memory to perform corresponding calculation and information transmission in order to complete the method provided in any aspect and the method in any possible design.

According to a tenth aspect, an embodiment of this application provides a transportation system. The transportation system includes, for example, the traffic control unit described in the second aspect or the eighth aspect, and the center service unit described in the fourth aspect or the sixth aspect.

In a possible design, compared with the traffic control unit, the center service unit has higher control power, more abundant functions, and a broader management range. One center service unit can manage a plurality of traffic control unit, while one traffic control unit can manage traffic resources on one road.

The method may be applied to a self-driving scenario of an emergency vehicle. In the self-driving scenario of the emergency vehicle, the emergency vehicle plans a travel path in an area in which the emergency vehicle can travel, and may complete, based on the area in which the emergency vehicle can travel, actions such as obstacle avoidance and a lane change. The method may also be applied to an assistant driving scenario such as automotive advanced driver assistance system (ADAS), ITS, and vehicle-to-Everything (V2X) of an emergency vehicle. In this case, the emergency vehicle may determine a spatial-temporal relationship between the emergency vehicle and a surrounding vehicle in an area in which the emergency vehicle can travel, to implement functions such as collision prediction, lane change assistance, intersection guidance, and violation identification.

It should be understood that any of the possible design methods can be freely combined with each other without violating a natural law.

According to the express lane planning method, the traffic control unit, and the center service unit provided in the present disclosure, an express lane may be quickly determined, and all other non-emergency vehicles can make a same avoidance response based on a same scheduling indication. Therefore, an express lane can be quickly formed such that an emergency vehicle can pass the express lane at a full speed. In this way, a time for the emergency vehicle to arrive at a destination is greatly shortened. In addition, an entire process is in strict order, thereby avoiding chaotic and useless avoidance of the non-emergency vehicles.

DESCRIPTION OF EMBODIMENTS

The following clearly describes the technical solutions in the embodiments of this application with reference to the accompanying drawings in the embodiments of this application.

Figure 1:
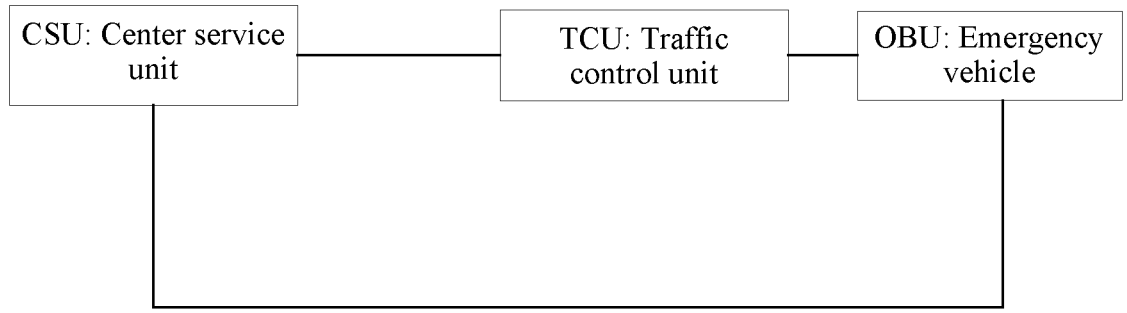
FIG. 1 is a diagram of a network architecture according to an embodiment of this application.

FIG. 1 is a diagram of a network architecture according to an embodiment of this application. The network architecture further includes a traffic control unit (TCU), a center service unit (CSU), and an on board unit (OBU) installed on an emergency vehicle.

The TCU can coordinate and control activities of traffic participants such as various vehicles. An ITS management range may be divided into a plurality of management areas based on map information, and a TCU is set for each management area. In this application, the TCU can open an express travel lane for the emergency vehicle. It should be noted that the TCU may be disposed independently as a functional entity, or may be disposed in an integrated manner with a network element of a communications network. For example, the TCU is deployed near a radio base station in an area that the TCU is responsible for management in order to more efficiently communicate with traffic participants that the TCU is responsible for coordination.

In a specific implementation process, the TCU may manage one or more roads, and usually manage one road. To implement effective scheduling, one road usually corresponds to one TCU, and the TCU manages traffic resources on this road.

The CSU may calculate an optimal path for a vehicle such that the TCU corresponds to a path in an area managed by the TCU, thereby monitoring and managing the TCU. For example, before an emergency vehicle arrives at a management area of the TCU, the CSU instructs the TCU to prepare an express travel lane in advance. The CSU is equivalent to a center subsystem of a European Telecommunications Standards Institute (ETSI) ITS architecture. It should be noted that the CSU may be disposed independently as a functional entity, or may be disposed in an integrated manner with the TCU.

Serving as an apparatus for receiving and using a number of a travel area or a travel lane, the OBU may be placed on a driving vehicle (because the OBU is usually integrated with the vehicle, for ease of description, the OBU, serving as an execution body, may also be directly referred to as a vehicle). The OBU includes but is not limited to a vehicle-mounted map terminal, such as a current vehicle-mounted terminal a navigation device, a telematics box (T-BOX), an OBD, or the like, or a vehicle-mounted device that implements an ADAS and an ITS service, or a vehicle-mounted device that implements a self-driving service, a pedestrian map terminal, such as a mobile phone or another handheld Global Positioning System (GPS) terminal, and another terminal, such as a terminal in a surveying and mapping field.

The OBU, the TCU, and the CSU may communicate with each other. For example, the OBU may report state data such as a vehicle location and speed to the TCU, and the TCU delivers an express travel lane number and other data to the OBU. For another example, the CSU sends related vehicle information to the TCU. For still another example, the OBU reports state data such as a vehicle location and speed to the CSU, and the CSU delivers data such as a planned lane to the OBU.

Figure 2:
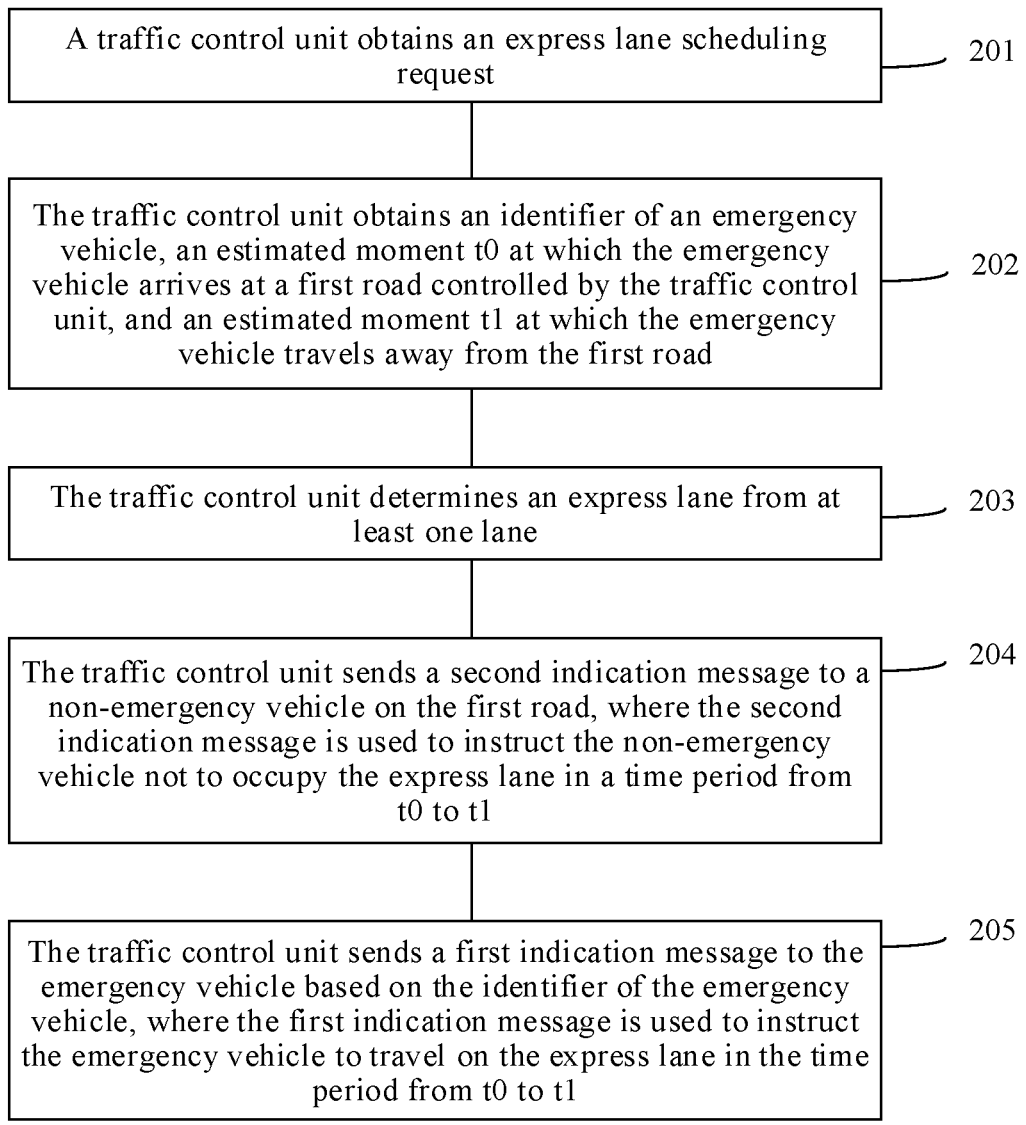
FIG. 2 is a flowchart of an express lane planning method according to an embodiment of this application.

FIG. 2 is a flowchart of an express lane planning method according to an embodiment of this application, and the method further includes the following steps.

Step 201. Before an emergency vehicle arrives at a first road, a traffic control unit obtains an express lane scheduling request, where the first road is a road controlled by the traffic control unit.

Optionally, the traffic control unit may obtain the express lane scheduling request from a vehicle, or may obtain the express lane scheduling request from a center service unit. The express lane scheduling request is used to indicate that the traffic control unit needs to plan an express lane for an emergency vehicle.

Step 202. The traffic control unit obtains an identifier of an emergency vehicle, an estimated moment t0 at which the emergency vehicle arrives at the first road controlled by the traffic control unit, and an estimated moment t1 at which the emergency vehicle travels away from the first road, where the first road includes at least one lane.

Emergency vehicle identifiers and emergency vehicles are in a one-to-one correspondence. Different emergency vehicles have their own unique emergency vehicle identifier. The emergency vehicle identifier may be a network system number, a license plate number, or the like. The emergency vehicle identifier is used to notify the traffic control unit of a vehicle for which the traffic control unit needs to plan an express lane, and nay be further used by the traffic control unit or the center service unit to determine a real-time location of the emergency vehicle.

The first road is a road controlled by the traffic control unit. The traffic control unit may control a vehicle and a traffic signal or another traffic rule on the first road in real time.

The moments t0 and t1 may be obtained through comprehensive calculation based on traffic information. The traffic information may include a current location of the emergency vehicle, a navigation path currently followed by the emergency vehicle, a location of the first road, a length of the first road, a speed of the vehicle (which may be an average speed or an instantaneous speed), and the like. The traffic information may be obtained by any one of the vehicle, the traffic control unit, and the center service unit. The moments t0 and t1 may be calculated by any one of the vehicle, the traffic control unit, and the center service unit. The navigation path may be a path planned by applications such as GOOGLE MAPS and BAIDU Maps, or may be temporarily planned by any one of the vehicle, the traffic control unit, and the center service unit by obtaining the current location and a destination of the emergency vehicle.

In a specific implementation process, because a traffic status constantly changes, t0 and t1 may be updated in real time, and t0 and t1 updated in real time can fully reflect a current traffic status such that the traffic control unit can more accurately control a traffic participant on the first road, and a planning speed and utilization efficiency of the express lane are higher.

Step 203. The traffic control unit determines an express lane from the at least one lane.

One road includes at least one lane. In most cases, one road includes at least two lanes. The present disclosure is intended to quickly plan an express lane for an emergency vehicle, that is, reserve a lane without an obstacle for the emergency vehicle such that the emergency vehicle can travel smoothly and quickly arrive at a destination.

Optionally, a leftmost or rightmost lane may be selected as the express lane, or a lane having a minimum quantity of vehicles is selected as the express lane (if one lane has five vehicles and another lane has 10 vehicles, the lane having five vehicles is selected as the express lane in order to reduce burden of scheduling a resource), or a lane matching a type of the emergency vehicle is selected as the express lane (if one lane is an emergency lane used for a special purpose, and another lane is a non-emergency lane, the emergency lane is selected as the express lane), or a lane with a preset number is selected as the express lane (for example, a second lane counted from the left to the right is the express lane), or a lane with a fastest vehicular traffic passing speed is selected as the express lane (if a vehicular passing speed of one lane is faster than that of another lane, the lane with the faster vehicular passing speed is selected as the express lane). A road selection manner may be flexibly determined by an ITS based on a historical traffic status or a plurality of current traffic factors.

Step 204. The traffic control unit sends a second indication message to a non-emergency vehicle on the first road, where the second indication message is used to instruct the non-emergency vehicle not to occupy the express lane in a time period from t0 to t1.

In a specific implementation process, the traffic control unit periodically broadcasts, in a form of the second indication message, t0 and t1 that are updated in real time to vehicles on the first road such that the traffic control unit can fully schedule and control the non-emergency vehicle on the first road to quickly travel away from the express lane before the moment to.

Optionally, the second indication message may include an express lane identifier to indicate which lane on the first road is an emergency lane. The express lane identifier may be a road number, for example, a second lane counted from the left is the express lane of the emergency vehicle. When receiving the second indication message, the non-emergency vehicle identifies that the second lane counted from the left is the express lane of the emergency vehicle and does not occupy the express lane in the specified time period.

If there is a non-emergency vehicle on the express lane on the first road, the second indication message instructs the non-emergency vehicle to immediately travel away from the current express lane or travel away from the current express lane before the moment t0 (to reserve a safe remaining time, the non-emergency vehicle may be controlled to travel away from the express lane before preset duration ahead of the moment t0, such as 15 seconds (s) ahead of the moment t0). If there is a non-emergency vehicle on another lane on the first road, the second indication message indicates that the non-emergency vehicle is forbidden from entering the express lane before the moment t1.

Optionally, if the express lane further includes a horizontal road intersection, the traffic control unit further needs to control a traffic light at the horizontal road intersection such that the traffic light indicates, in at least the time period from t0 to t1, that a non-emergency vehicle, a non-motor vehicle, and a pedestrian are forbidden from traversing the express lane (to reserve a safe remaining time, the traffic light may be controlled, before preset duration ahead of the moment t0, such as 20s ahead of the moment t0, to indicate that the non-emergency vehicle, the non-motor vehicle, and the pedestrian are forbidden from traversing the express lane). Alternatively, the horizontal road intersection is directly closed.

Step 205. The traffic control unit sends a first indication message to the emergency vehicle based on the identifier of the emergency vehicle, where the first indication message is used to instruct the emergency vehicle to travel on the express lane in the time period from t0 to t1.

Optionally, when planning the express lane without a non-emergency vehicle before the moment t0, the traffic control unit may send the first indication message to the emergency vehicle based on the identifier of the emergency vehicle, to indicate the emergency vehicle that the emergency vehicle can use the express way. In the time period from t0 to t1, the emergency vehicle can travel at a full speed provided that the emergency vehicle travels safely.

Optionally, the first indication message may include an express lane identifier to indicate which lane on the first road is an emergency lane. The express lane identifier may be a road number, for example, a second lane counted from the left is the express lane of the emergency vehicle. When receiving the second indication message, the emergency vehicle identifies that the second lane counted from the left is the express lane of the emergency vehicle, and directly enters the express lane in a subsequent travel process.

If the traffic control unit needs to plan an express lane on the first road for a plurality of emergency vehicles, the traffic control unit may plan that these emergency vehicles travel on the express lane in sequence.

In a specific implementation process, after the emergency vehicle travels away from the express lane, the traffic control unit may further broadcast a third indication message to indicate that a vehicle on another lane can enter the original express lane, the traffic control unit may further recover the signal light into a normal working state, and the traffic control unit may further send an express lane release message to the center service unit such that the center service unit can make a subsequent traffic management decision.

Figure 3:
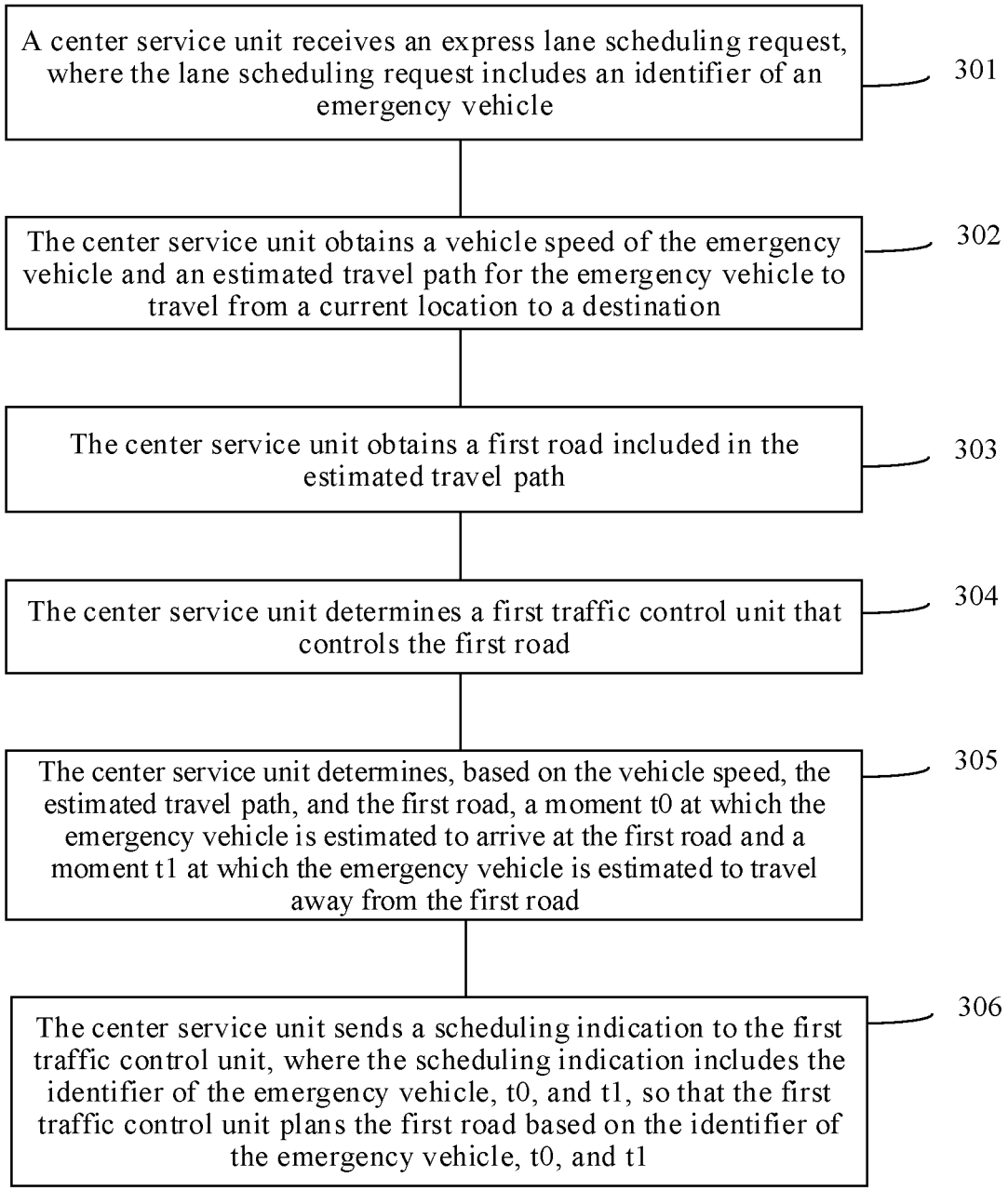
FIG. 3 is a flowchart of another express lane planning method according to an embodiment of this application.

FIG. 3 is a flowchart of another express lane planning method according to an embodiment of this application, and the method further includes the following steps.

Step 301. A center service unit receives an express lane scheduling request, where the express lane scheduling request includes an identifier of an emergency vehicle.

The center service unit may receive the express lane scheduling request from an emergency vehicle, or may receive the express lane scheduling request from a traffic control unit. For example, the traffic control unit may forward the express lane scheduling request of the emergency vehicle to the center service unit.

Optionally, the center service unit may further determine whether the express lane scheduling request is valid. If the center service unit determines that the scheduling request is valid, the center service unit continues to perform the following steps, or if the center service unit determines that the scheduling request is invalid, the center service unit rejects the scheduling request or makes no response to the scheduling request.

Step 302. The center service unit obtains a speed of the emergency vehicle and an estimated travel path for the emergency vehicle to travel from a current location to a destination.

The center service unit may directly obtain, from the emergency vehicle, the speed of the emergency vehicle and the estimated travel path for the emergency vehicle to travel from the current location to the destination, or may indirectly obtain, from the traffic control unit, the speed of the emergency vehicle and the estimated travel path for the emergency vehicle to travel from the current location to the destination. The estimated travel path may be a navigation path planned by applications such as GOOGLE MAPS and BAIDU Maps, or may be planned by any one of the vehicle, the traffic control unit, and the center service unit by obtaining the current location and the destination of the emergency vehicle. For example, the planning method may include determining the estimated travel path based on a shortest time for the emergency vehicle to travel from the current location to the destination, determining the estimated travel path based on a minimum quantity of traffic lights passed by the emergency vehicle to travel from the current location to the destination, or determining the estimated travel path based on a least amount of vehicular traffic from the current location to the destination.

Step 303. The center service unit obtains a first road included in the estimated travel path.

The estimated travel path is a route for the emergency vehicle to travel from the current location to the destination. The route usually includes at least one road. For ease of description, the first road herein is any one of the at least one road.

Step 304. The center service unit determines a first traffic control unit that controls the first road.

When receiving the express lane scheduling request, the center service unit needs to globally consider how to plan an express channel on the entire path. Therefore, the center service unit needs to schedule traffic control units corresponding to all roads included in the entire route, and the traffic control units complete traffic resource scheduling together, to ensure that the emergency vehicle continually uses the express lane on the estimated travel path of the emergency vehicle. The traffic control unit herein is generally a traffic control unit controlling any one of the at least one road, and corresponds to the first road.

Step 305. The center service unit determines, based on the speed, the estimated travel path, and the first road, a moment t0 at which the emergency vehicle is estimated to arrive at the first road and a moment t1 at which the emergency vehicle is estimated to travel away from the first road.

Specifically, t0 and t1 may be obtained through comprehensive calculation based on traffic information. The traffic information may include the current location of the emergency vehicle, the estimated travel path of the emergency vehicle (such as a navigation path currently followed by the emergency vehicle), a location of the first road, a length of the first road, the speed of the vehicle (which may be an average speed or an instantaneous speed), and the like. The traffic information may be calculated by the center service unit, or indirectly obtained from the vehicle or the traffic control unit, and t0 and t1 may be performed by the center service unit, or indirectly obtained from the vehicle or the traffic control unit.

Step 306. The center service unit sends a scheduling indication to the first traffic control unit, where the scheduling indication includes the identifier of the emergency vehicle, t0, and t1 such that the first traffic control unit plans the first road based on the identifier of the emergency vehicle, t0, and t1.

In a specific implementation process, the center service unit sends the scheduling indication to a traffic control unit corresponding to each road on the estimated travel path such that each traffic control unit performs steps 201 to 205. Because the first road and the first traffic control unit are general terms, it should be understood that signal interaction of traffic control units is the same or similar to each other, but is also independent of each other.

For example, the estimated travel path includes a road A and a road B, and traffic control units corresponding to the road A and the road B are respectively a unit A and a unit B. In this case, the center service unit performs step 306 on both the unit A and the unit B. However, a moment (t0A) that is obtained by the unit A and at which the emergency vehicle enters the road A is different from a moment (t0B) that is obtained by the unit B and at which the emergency vehicle enters the road B, and a moment (t1A) at which the emergency vehicle travels away from the road A is also different from a moment (t1B) at which the emergency vehicle travels away from the road B. Therefore, when the unit A performs steps 201 to 205 and the unit B performs steps 201 to 205, there is a difference between a time for planning an express lane on the road A and a time for planning an express lane on the road B.

In addition, in a specific implementation process, when the estimated travel path obtained by the center service unit includes a plurality of roads, the center service unit may further control a traffic light among a plurality of roads to indicate that a vehicle is allowed to travel among the plurality of roads. For example, traffic lights between all the roads on path are green.

Figure 4:
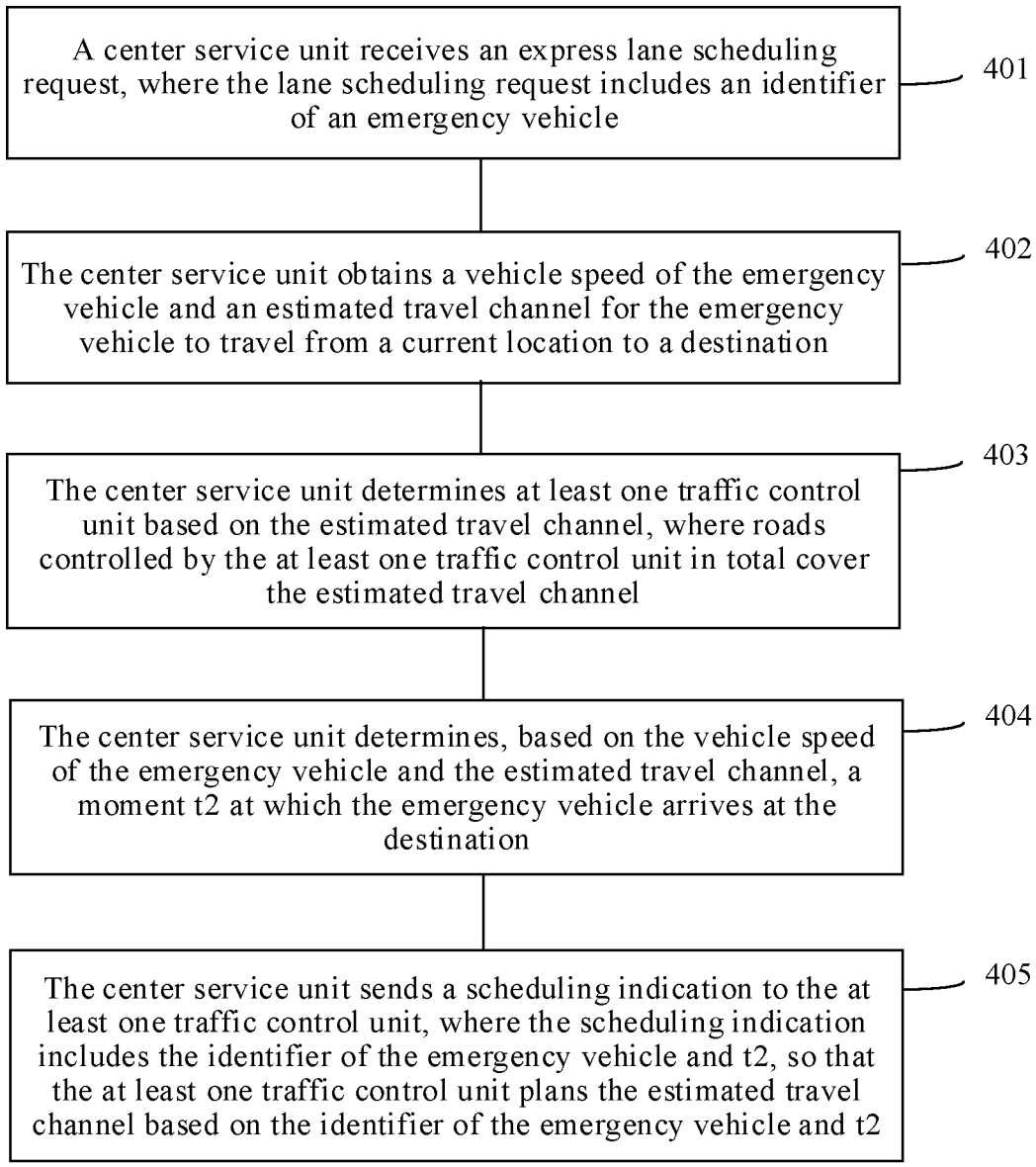
FIG. 4 is a flowchart of another express lane planning method according to an embodiment of this application.

FIG. 4 is a flowchart of another express lane planning method according to an embodiment of this application, and the method further includes the following steps.

Step 401. A center service unit receives an express lane scheduling request, where the express lane scheduling request includes an identifier of an emergency vehicle.

The center service unit may receive the express lane scheduling request from an emergency vehicle, or may receive the express lane scheduling request from a traffic control unit. For example, the traffic control unit may forward the express lane scheduling request of the emergency vehicle to the center service unit.

Optionally, the center service unit may further determine whether the express lane scheduling request is valid. If the center service unit determines that the scheduling request is valid (for example, the center service unit learns that a vehicle type of the emergency vehicle may be a police car, a fire-fighting truck, or an ambulance, or the center service unit determines, from obtained global traffic information, that the vehicle has a requirement with a higher priority), the center service unit continues to perform the following steps, or if the center service unit determines that the scheduling request is invalid, the center service unit rejects the scheduling request or makes no response to the scheduling request.

Step 402. The center service unit obtains a speed of the emergency vehicle and an estimated travel channel for the emergency vehicle to travel from a current location to a destination.

The center service unit may directly obtain, from the emergency vehicle, the speed of the emergency vehicle and an estimated travel path for the emergency vehicle to travel from the current location to the destination, or may indirectly obtain, from the traffic control unit, the speed of the emergency vehicle and an estimated travel path for the emergency vehicle to travel from the current location to the destination. The estimated travel path may be a navigation path planned by applications such as GOOGLE MAPS and BAIDU Maps, or may be planned by any one of the vehicle, the traffic control unit, and the center service unit by obtaining the current location and the destination of the emergency vehicle. For example, the planning method may include determining the estimated travel path based on a shortest time for the emergency vehicle to travel from the current location to the destination, determining the estimated travel path based on a minimum quantity of traffic lights passed by the emergency vehicle to travel from the current location to the destination, or determining the estimated travel path based on a least amount of vehicular traffic from the current location to the destination.

It should be noted that a difference between step 402 and step 302 lies in that the estimated travel channel needs to be determined from the estimated travel path. The estimated travel path usually includes a plurality of roads, and each road includes a plurality of lanes. Therefore, to more effectively and quickly schedule traffic resources, a lane-level estimated travel channel for the emergency vehicle to travel from the current location to the destination needs to be quickly planned, that is, a specific lane on which the emergency travels on each road needs to be determined.

Optionally, a leftmost or rightmost lane may be selected as the express lane, or a lane having a minimum quantity of vehicles is selected as the express lane (if one lane has five vehicles and another lane has 10 vehicles, the lane having five vehicles is selected as the express lane in order to reduce burden of scheduling a resource), or a lane matching a type of the emergency vehicle is selected as the express lane (if one lane is an emergency lane used for a special purpose, and another lane is a non-emergency lane, the emergency lane is selected as the express lane), or a lane with a preset number is selected as the express lane (for example, a second lane counted from the left to the right is the express lane), or a lane with a fastest vehicular traffic passing speed is selected as the express lane (if a vehicular passing speed of one lane is faster than that of another lane, the lane with the faster vehicular passing speed is selected as the express lane). A road selection manner may be flexibly determined by an ITS based on a historical traffic status or a plurality of current traffic factors.

In a specific implementation process, the estimated travel channel may be determined by the center service unit, or may be indirectly obtained from a vehicle, for example, the vehicle plans an estimated travel channel and sends the estimated travel channel to the center service unit for reference, or may be indirectly obtained from a traffic control unit corresponding to each road, for example, each traffic control unit determines an express lane from a road controlled by the traffic control unit, and sends the express lane to the center service unit, and these express lanes form an estimated travel channel together.

Step 403. The center service unit determines at least one traffic control unit based on the estimated travel channel, where roads controlled by the at least one traffic control unit in total cover the estimated travel channel.

Once the estimated travel channel is determined, the corresponding traffic control unit determined.

Specifically, the center service unit determines, based on the estimated travel channel, N traffic control units and an $i^{th}$ express lane corresponding to an $i^{th}$ traffic control unit, where the $i^{th}$ traffic control unit is one of the N traffic control units, the estimated travel channel includes the $i^{th}$ express lane, and i takes all positive integers not greater than N.

Step 404. The center service unit determines, based on the speed of the emergency vehicle and the estimated travel channel, the moment t2 at which the emergency vehicle arrives at the destination.

Specifically, t2 may be obtained through comprehensive calculation based on traffic information. The traffic information may include a length of the estimated travel channel of the emergency vehicle, the speed of the vehicle (which may be an average speed or an instantaneous speed), and the like. The center service unit may obtain the traffic information and calculate t2.

Step 405. The center service unit sends a scheduling indication to the at least one traffic control unit, where the scheduling indication includes the identifier of the emergency vehicle and t2 such that the at least one traffic control unit plans the estimated travel channel based on the identifier of the emergency vehicle and t2.

Specifically, the center service unit sends the scheduling indication to the $i^{th}$ traffic control unit. The scheduling indication includes the identifier of the emergency vehicle, t2, and an identifier of the $i^{th}$ express lane such that the $i^{th}$ traffic control unit plans the $i^{th}$ express lane based on the identifier of the emergency vehicle and t2. The identifier of the $i^{th}$ express lane may be a lane number of a road controlled by the $i^{th}$ traffic control unit, or a specific lane shown through navigation. The identifier of the $i^{th}$ express lane is used to identify the $i^{th}$ express lane.

In a specific implementation process, the center service unit sends the scheduling indication to a traffic control unit corresponding to each road on the estimated travel path such that each traffic control unit performs the following steps 501 to 505.

Figure 5:
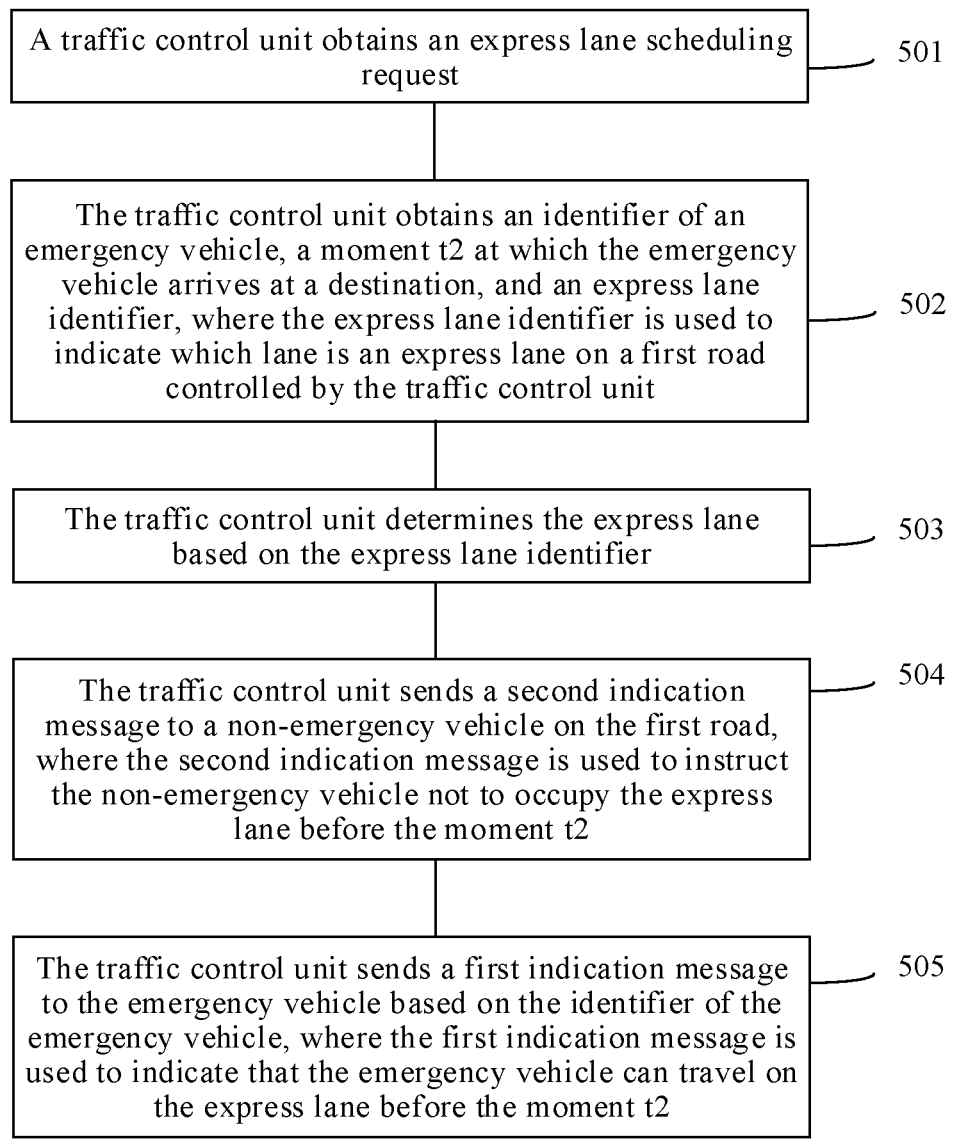
FIG. 5 is a flowchart of another express lane planning method according to an embodiment of this application.

FIG. 5 is a flowchart of an express lane planning method according to an embodiment of this application, and the method further includes the following steps.

Step 501. A traffic control unit obtains an express lane scheduling request.

Optionally, the traffic control unit may obtain the express lane scheduling request from a center service unit. The express lane scheduling request is used to indicate that the traffic control unit needs to plan an express lane for an emergency vehicle.

Step 502. The traffic control unit obtains an identifier of an emergency vehicle, a moment t2 at which the emergency vehicle arrives at a destination, and an express lane identifier, where the express lane identifier is used to indicate which lane is an express lane on a first road controlled by the traffic control unit, and may be a lane number or a specific lane shown in a navigation map.

Optionally, the traffic control unit may obtain, from the center service unit, the identifier of the emergency vehicle, the moment t2 at which the emergency vehicle arrives at the destination, and the express lane identifier. The express lane identifier is determined by the center service unit in advance. For example, the express lane identifier indicates that a rightmost lane on the first road controlled by the traffic control unit is an express lane.

Step 503. The traffic control unit determines the express lane based on the express lane identifier.

Step 504. The traffic control unit sends a second indication message to a non-emergency vehicle on the first road, where the second indication message is used to instruct the non-emergency vehicle not to occupy the express lane before the moment t2.

In a specific implementation process, the traffic control unit needs to periodically broadcast, in a form of the second indication message, t2 updated in real time to vehicles on the first road. If there is a non-emergency vehicle on the express lane on the first road, the second indication message instructs the non-emergency vehicle to immediately travel away from the current express lane and not to use or occupy the express lane before the moment t2. If there is a non-emergency vehicle on another lane on the first road, the second indication message indicates that the non-emergency vehicle is forbidden from using and occupying the express lane before the moment t2.

Step 505. The traffic control unit sends a first indication message to the emergency vehicle based on the identifier of the emergency vehicle, where the first indication message is used to indicate that the emergency vehicle can travel on the express lane before the moment t2.

In a specific implementation process, when the traffic control unit detects that the emergency vehicle travels away from the express lane, that is, travels away from the first road, the traffic control unit further sends a third indication message to the non-emergency vehicle on the first road. The third indication message is used to indicate that the express lane on the first road is recovered for use. The traffic control unit also recovers a normal road management function for the road.

If the express lane includes a horizontal road intersection, the traffic control unit controls a traffic light at the horizontal road intersection such that the traffic light indicates, before at least the moment t2, that a non-emergency vehicle, a non-motor vehicle, and a pedestrian are forbidden from traversing the express lane.

In other approaches, a non-emergency vehicle can identify only an emergency vehicle. However, a large quantity of non-emergency vehicles make different responses to avoidance of the emergency vehicle, and there is no uniform plan. As a result, an entire avoidance process is chaotic, and consequently the express lane in the present disclosure cannot be formed. According to the express lane planning method provided in the embodiments of the present disclosure, a traffic system can enable other vehicles to smoothly and orderly avoid an emergency vehicle based on a uniform plan in order to quickly plan an express lane for the emergency vehicle, and ensure that the express lane is unoccupied in an estimated time. Therefore, the emergency vehicle can travel on the express lane without an obstacle, and more quickly arrive at a destination.

Figure 6:
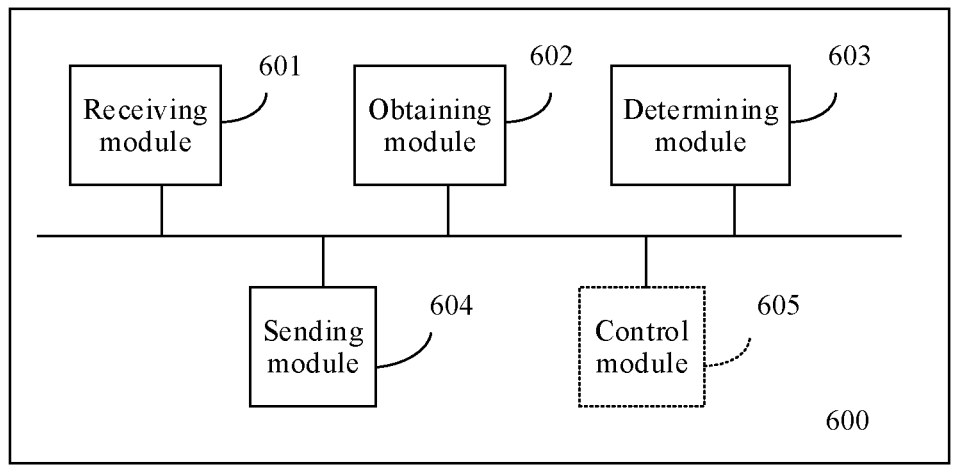
FIG. 6 is a schematic module composition diagram of a traffic control unit according to an embodiment of this application.

Based on the express lane planning method provided in the foregoing embodiment, an embodiment of the present disclosure provides a traffic control unit 600. As shown in FIG. 6, the traffic control unit 600 may include a receiving module 601, an obtaining module 602, a determining module 603, and a sending module 604.

The receiving module 601 is configured to obtain an express lane scheduling request. This module may be implemented by a transceiver.

The obtaining module 602 is configured to obtain an identifier of an emergency vehicle, a moment t0 at which the emergency vehicle arrives at a first road controlled by the traffic control unit, and a moment t1 at which the emergency vehicle travels away from the first road. The first road includes at least one lane. This module may be implemented by a processor by invoking a program instruction in a memory or an externally input program instruction, and may also receive related information using a transceiver.

The determining module 603 is configured to determine an express lane from the at least one lane. This module may be implemented by a processor by invoking a program instruction in a memory or an externally input program instruction.

The sending module 604 is configured to send a second indication message to a non-emergency vehicle on the first road, where the second indication message is used to instruct the non-emergency vehicle not to occupy the express lane in a time period from t0 to t1, and further send a first indication message to the emergency vehicle based on the identifier of the emergency vehicle, where the first indication message is used to instruct the emergency vehicle to travel on the express lane in the time period from t0 to t1. This module may be implemented by a processor by invoking a program instruction in a memory or an externally input program instruction, and may send an indication message using a transceiver.

The traffic control unit 600 further includes a control module 605 configured to, when the express lane includes a horizontal road intersection, control a traffic light at the horizontal road intersection such that the traffic light indicates, in at least the time period from t0 to t1, that a non-emergency vehicle, a non-motor vehicle, and a pedestrian are forbidden from traversing the express lane.

In a specific implementation process, the receiving module 601 is further configured to perform the method mentioned in step 201 and a method that can equivalently replace the method. The obtaining module 602 is further configured to perform the method mentioned in step 202 and a method that can equivalently replace the method. The determining module 603 is further configured to perform the method mentioned in step 203 and a method that can equivalently replace the method. The sending module 604 is further configured to perform the method mentioned in step 204 or step 205 and a method that can equivalently replace the method. The foregoing specific method embodiment and explanations and descriptions in the embodiment are also applicable to method execution of the traffic control unit 600.

Figure 7:
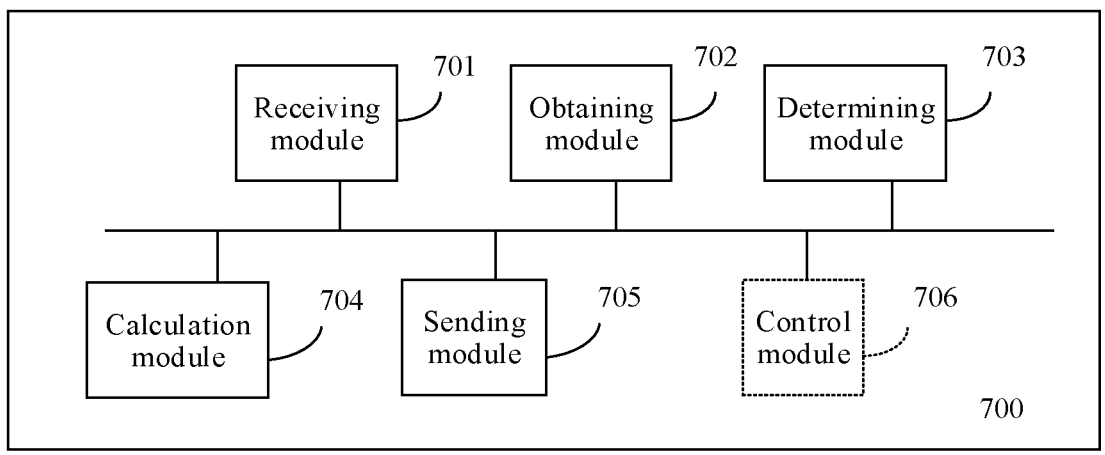
FIG. 7 is a schematic module composition diagram of a center service unit according to an embodiment of this application.

An embodiment of the present disclosure provides a center service unit 700. As shown in FIG. 7, the center service unit 700 may include a receiving module 701, an obtaining module 702, a determining module 703, a calculation module 704, and a sending module 705.

The receiving module 701 is configured to receive an express lane scheduling request. The express lane scheduling request includes an identifier of an emergency vehicle. This module may be implemented by a transceiver.

The obtaining module 702 is configured to obtain a speed of the emergency vehicle and an estimated travel path for the emergency vehicle to travel from a current location to a destination, and further obtain a first road included in the estimated travel path. This module may be implemented by a processor by invoking a program instruction in a memory or an externally input program instruction, and may also receive related information using a transceiver.

The determining module 703 is configured to determine a traffic control unit that controls the first road. This module may be implemented by a processor by invoking a program instruction in a memory or an externally input program instruction.

The calculation module 704 is configured to determine, based on the speed, the estimated travel path, and the first road, a moment t0 at which the emergency vehicle arrives at the first road and a moment t1 at which the emergency vehicle travels away from the first road. This module may be implemented by a processor by invoking a program instruction in a memory or an externally input program instruction.

The sending module 705 is configured to send a scheduling indication to the first traffic control unit. The scheduling indication includes the identifier of the emergency vehicle, t0, and t1 such that the first traffic control unit plans the first road based on the identifier of the emergency vehicle, t0, and t1. This module may be implemented by a processor by invoking a program instruction in a memory or an externally input program instruction, and may send an indication message using a transceiver.

The center service unit 700 further includes a control module 706 configured to, when the estimated travel path includes a plurality of roads, control a traffic light among the plurality of roads to indicate that a vehicle is allowed to pass through the plurality of roads. This module may be implemented by a processor by invoking a program instruction in a memory or an externally input program instruction, to generate a control signal to control a display device.

In a specific implementation process, the receiving module 701 is further configured to perform the method mentioned in step 301 and a method that can equivalently replace the method. The obtaining module 702 is further configured to perform the method mentioned in step 302 or step 303 and a method that can equivalently replace the method. The determining module 703 is further configured to perform the method mentioned in step 304 and a method that can equivalently replace the method. The calculation module 704 is further configured to perform the method mentioned in step 305 and a method that can equivalently replace the method. The sending module 705 is further configured to perform the method mentioned in step 306 and a method that can equivalently replace the method. The foregoing specific method embodiment and explanations and descriptions in the embodiment are also applicable to method execution of the unit.

Figure 8:
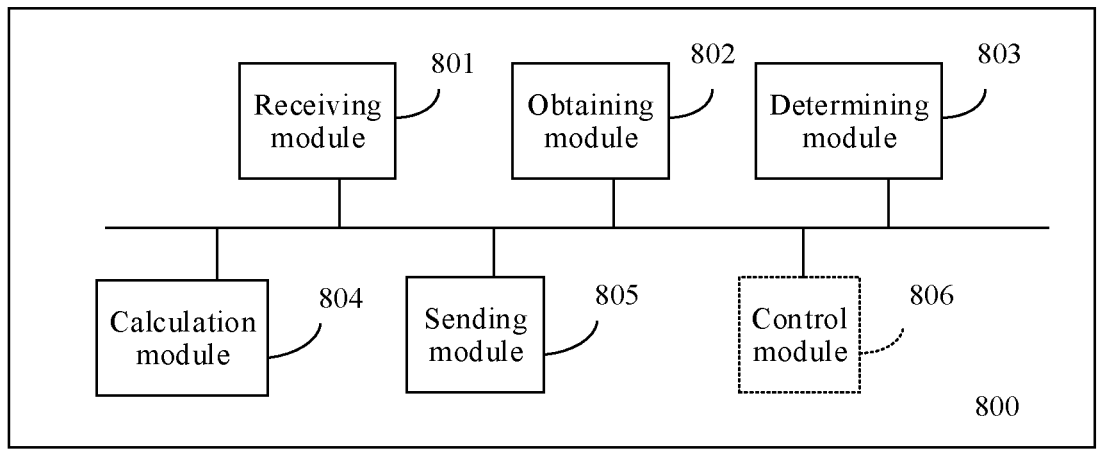
FIG. 8 is a schematic module composition diagram of another center service unit according to an embodiment of this application.

An embodiment of the present disclosure further provides another center service unit 800. As shown in FIG. 8, the center service unit 800 may include a receiving module 801, an obtaining module 802, a determining module 803, a calculation module 804, and a sending module 805.

The receiving module 801 is configured to receive an express lane scheduling request. The express lane scheduling request includes an identifier of an emergency vehicle. This module may be implemented by a transceiver.

The obtaining module 802 is configured to obtain a speed of the emergency vehicle and an estimated travel channel for the emergency vehicle to travel from a current location to a destination. This module may be implemented by a processor by invoking a program instruction in a memory or an externally input program instruction, and may also receive related information using a transceiver.

The determining module 803 is configured to determine, based on the estimated travel channel, N traffic control units and an $i^{th}$ express lane corresponding to an $i^{th}$ traffic control unit. The $i^{th}$ traffic control unit is one of the N traffic control units, the estimated travel channel includes the $i^{th}$ express lane, and i takes all positive integers not greater than N. This module may be implemented by a processor by invoking a program instruction in a memory or an externally input program instruction.

The calculation module 804 is configured to determine, based on the speed and the estimated travel channel, a moment t2 at which the emergency vehicle arrives at the destination. This module may be implemented by a processor by invoking a program instruction in a memory or an externally input program instruction.

The sending module 805 is configured to send a scheduling indication to the $i^{th}$ traffic control unit. The scheduling indication includes the identifier of the emergency vehicle, t2, and an identifier of the $i^{th}$ express lane such that the $i^{th}$ traffic control unit plans the $i^{th}$ express lane based on the identifier of the emergency vehicle and t2. This module may be implemented by a processor by invoking a program instruction in a memory or an externally input program instruction, and may send an indication message using a transceiver.

The center service unit 800 further includes a control module 806 configured to, when the estimated travel channel includes a plurality of roads, control a traffic light among the plurality of roads to indicate that a vehicle is allowed to pass through the plurality of roads. This module may be implemented by a processor by invoking a program instruction in a memory or an externally input program instruction, to generate a control signal to control a display device.

In a specific implementation process, the receiving module 801 is further configured to perform the method mentioned in step 401 and a method that can equivalently replace the method. The obtaining module 802 is further configured to perform the method mentioned in step 402 and a method that can equivalently replace the method. The determining module 803 is further configured to perform the method mentioned in step 403 and a method that can equivalently replace the method. The calculation module 804 is further configured to perform the method mentioned in step 404 and a method that can equivalently replace the method. The sending module 805 is further configured to perform the method mentioned in step 405 and a method that can equivalently replace the method. The foregoing specific method embodiment and explanations and descriptions in the embodiment are also applicable to method execution of the unit.

Figure 9:
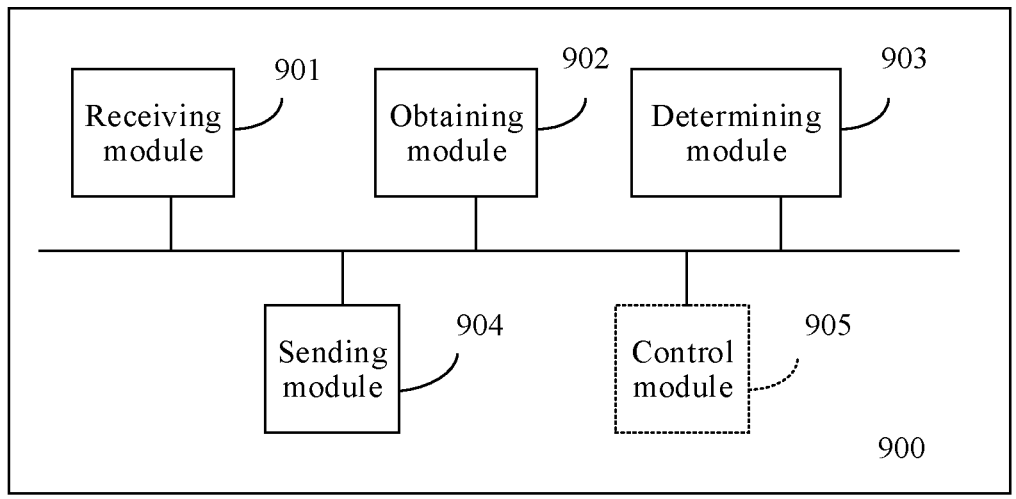
FIG. 9 is a schematic module composition diagram of another traffic control unit according to an embodiment of this application.

An embodiment of the present disclosure further provides another traffic control unit 900. As shown in FIG. 9, the traffic control unit 900 may include a receiving module 901, an obtaining module 902, a determining module 903, and a sending module 904.

The receiving module 901 is configured to obtain an express lane scheduling request. This module may be implemented by a transceiver.

The obtaining module 902 is configured to obtain an identifier of an emergency vehicle, a moment t2 at which the emergency vehicle arrives at a destination, and an express lane identifier. The express lane identifier is used to indicate which lane is an express lane on a first road controlled by the traffic control unit. This module may be implemented by a processor by invoking a program instruction in a memory or an externally input program instruction, and may also receive related information using a transceiver.

The determining module 903 is configured to determine the express lane based on the express lane identifier. This module may be implemented by a processor by invoking a program instruction in a memory or an externally input program instruction.

The sending module 904 is configured to send a second indication message to a non-emergency vehicle on the first road, where the second indication message is used to instruct the non-emergency vehicle not to occupy the express lane before the moment t2, and further send a first indication message to the emergency vehicle based on the identifier of the emergency vehicle, where the first indication message is used to indicate that the emergency vehicle can travel on the express lane before the moment t2. The sending module 904 is configured to, when it is detected that the emergency vehicle travels away from the first road, send a third indication message to the non-emergency vehicle on the first road. The third indication message is used to indicate that the express lane on the first road is recovered for use. This module may be implemented by a processor by invoking a program instruction in a memory or an externally input program instruction, and may send an indication message using a transceiver.

The traffic control unit 900 further includes a control module 905 configured to, when the express lane includes a horizontal road intersection, control a traffic light at the horizontal road intersection such that the traffic light indicates, before at least the moment t2, that a non-emergency vehicle, a non-motor vehicle, and a pedestrian are forbidden from traversing the express lane.

In a specific implementation process, the receiving module 901 is further configured to perform the method mentioned in step 501 and a method that can equivalently replace the method. The obtaining module 902 is further configured to perform the method mentioned in step 502 and a method that can equivalently replace the method. The determining module 903 is further configured to perform the method mentioned in step 503 and a method that can equivalently replace the method. The sending module 904 is further configured to perform the method mentioned in steps 504 and 505 and a method that can equivalently replace the method. The foregoing specific method embodiment and explanations and descriptions in the embodiment are also applicable to method execution of the unit.

Figure 10:
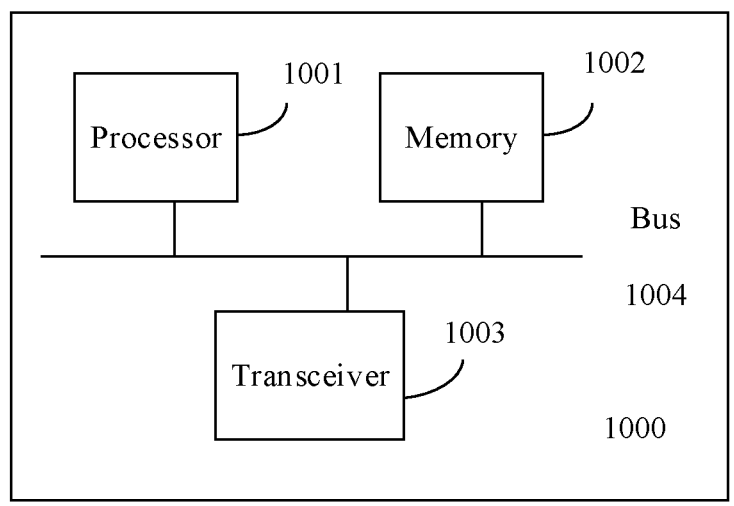
FIG. 10 is a schematic hardware composition diagram of a transportation management device according to an embodiment of this application.

An embodiment of this application provides a transportation management device 1000. As shown in FIG. 10, the device includes a processor 1001, a memory 1003, a transceiver 1003, and a bus 1004. The processor 1001, the memory 1002, and the transceiver 1003 are connected to each other by the bus 1004. The memory 1002 stores a program instruction. The transceiver 1003 is configured to receive and send information. The processor 1001 is configured to invoke the program instruction in the memory 1002 to perform corresponding calculation and information transmission in order to complete any method and any possible designed method provided by the foregoing embodiment.

An embodiment of this application provides a transportation system. The transportation system includes the traffic control unit 600 or 900 and the center service unit 700 or 800.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a compact disc-read only memory (CD-ROM), an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. An express lane planning method, implemented by a traffic control unit, wherein the express lane planning method comprises:
    obtaining an express lane scheduling request;
    obtaining an identifier of an emergency vehicle, a first moment at which the emergency vehicle arrives at a road controlled by the traffic control unit, and a second moment at which the emergency vehicle travels away from the road, wherein the road comprises at least one lane, and wherein the first moment and the second moment are obtained prior to the emergency vehicle arriving at the road;
    determining an express lane from the at least one lane;
    sending a first indication message to the emergency vehicle based on the identifier of the emergency vehicle, wherein the first indication message instructs the emergency vehicle to travel on the express lane in a time period from the first moment to the second moment; and
    sending a second indication message to a non-emergency vehicle on the road, wherein the second indication message instructs the non-emergency vehicle not to occupy the express lane in the time period.

2. The express lane planning method of claim 1, further comprising, when the road comprises at least two lanes, selecting as the express lane a rightmost lane, selecting a leftmost lane, selecting a lane having a minimum quantity of vehicles, selecting a lane matching a type of the emergency vehicle, selecting a lane with a preset number, or selecting a lane with a fastest vehicular traffic passing speed.

3. The express lane planning method of claim 1, further comprising controlling, when the express lane comprises a horizontal road intersection, a traffic light at the horizontal road intersection to indicate that the non-emergency vehicle, a non-motor vehicle, and a pedestrian are forbidden from traversing the express lane in at least the time period.

4. The express lane planning method of claim 1, further comprising sending a third indication message to the non-emergency vehicle on the road to indicate that the express lane is recovered for use when the emergency vehicle travels away from the express lane.

5. The express lane planning method of claim 1, wherein the first and second moments are obtained based on traffic information and a current location of the emergency vehicle.

6. The express lane planning method of claim 5, further comprising updating the first moment and the second moment responsive to a change in the traffic information.

7. An express lane planning method, implemented by a center service unit, wherein the express lane planning method comprises:
    receiving an express lane scheduling request comprising an identifier of an emergency vehicle;
    obtaining a speed of the emergency vehicle;
    obtaining an estimated travel path for the emergency vehicle to travel from a current location to a destination;
    obtaining a road comprised in the estimated travel path;
    determining a traffic control unit that controls the road;
    determining a first moment at which the emergency vehicle is to arrive at the road based on the speed, the estimated travel path, and the road, wherein the first moment is obtained prior to the emergency vehicle arriving at the road;
    determining, based on the speed, the estimated travel path, and the road, a second moment at which the emergency vehicle is to travel away from the road, wherein the second moment is obtained prior to the emergency vehicle arriving at the road; and
    sending a scheduling indication to the traffic control unit, wherein the scheduling indication comprises the identifier of the emergency vehicle, the first moment, and the second moment, to prompt the traffic control unit to plan the road based on the identifier of the emergency vehicle, the first moment, and the second moment.

8. The express lane planning method of claim 7, further comprising controlling a traffic light among a plurality of lanes to indicate that a vehicle is allowed to pass through the plurality of lanes when the estimated travel path comprises the plurality of lanes.

9. The express lane planning method of claim 7, further comprising determining the estimated travel path:

based on a shortest estimated time for the emergency vehicle to travel from the current location to the destination;

based on a minimum quantity of traffic lights passed by the emergency vehicle to travel from the current location to the destination; or based on a least amount of vehicular traffic from the current location to the destination.

10. The express lane planning method of claim 7, wherein the first and second moments are determined based on traffic information, and wherein the method further comprises updating the first moment and the second moment responsive to a change in the traffic information.

11. A traffic control unit, comprising:
a processor; and
a memory coupled to the processor and storing instructions that, when executed by the processor, cause the traffic control unit to be configured to:
obtain an express lane scheduling request;
obtain an identifier of an emergency vehicle, a first moment at which the emergency vehicle arrives at a road controlled by the traffic control unit, and a second moment at which the emergency vehicle travels away from the road, wherein the road comprises at least one lane, and wherein the first moment and the second moment are obtained prior to the emergency vehicle arriving at the road;
determine an express lane from the at least one lane;
send a first indication message to the emergency vehicle based on the identifier of the emergency vehicle, wherein the first indication message instructs the emergency vehicle to travel on the express lane in a time period from the first moment to the second moment; and
send a second indication message to a non-emergency vehicle on the road, wherein the second indication message instructs the non-emergency vehicle not to occupy the express lane in the time period.

12. The traffic control unit of claim 11, wherein the instructions further cause the processor to be configured to, when the road comprises at least two lanes, select as the express lane a rightmost lane, select a leftmost lane, select a lane having a minimum quantity of vehicles, select a lane matching a type of the emergency vehicle, select a lane with a preset number, or select a lane with a fastest vehicular traffic passing speed.

13. The traffic control unit of claim 11, wherein the instructions further cause the processor to be configured to control, when the express lane comprises a horizontal road intersection, a traffic light at the horizontal road intersection to indicate that the non-emergency vehicle, a non-motor vehicle, and a pedestrian are forbidden from traversing the express lane in at least the time period.

14. The traffic control unit of claim 11, wherein the instructions further cause the processor to be configured to send a third indication message to the non-emergency vehicle on the road to indicate that the express lane is recovered for use when the emergency vehicle travels away from the express lane.

15. The traffic control unit of claim 11, wherein the first and second moments are obtained based on traffic information and a current location of the emergency vehicle.

16. The traffic control unit of claim 15, wherein the instructions further cause the processor to be configured to update the first moment and the second moment responsive to a change in the traffic information.

17. A center service unit, comprising:
a processor; and
a memory coupled to the processor and storing instructions that, when executed by the processor, cause the center service unit to be configured to:
receive an express lane scheduling request comprising an identifier of an emergency vehicle;
obtain a speed of the emergency vehicle;
obtain an estimated travel path for the emergency vehicle to travel from a current location to a destination;
obtain a road comprised in the estimated travel path;
determine a traffic control unit that controls the road;
determine a first moment at which the emergency vehicle arrives at the road based on the speed, the estimated travel path, and the road, wherein the first moment is obtained prior to the emergency vehicle arriving at the road;
determine a second moment at which the emergency vehicle travels away from the road based on the speed, the estimated travel path, and the road, wherein the second moment is obtained prior to the emergency vehicle arriving at the road; and
send a scheduling indication to the traffic control unit, wherein the scheduling indication comprises the identifier of the emergency vehicle, the first moment, and the second moment to prompt the first traffic control unit to plan the first road based on the identifier of the emergency vehicle, the first moment, and the second moment.

18. The center service unit of claim 17, wherein the instructions further cause the processor to be configured to control a traffic light among a plurality of lanes to indicate that a vehicle is allowed to pass through the plurality of lanes when the estimated travel path comprises the plurality of lanes.

19. The center service unit of claim 17, wherein the instructions further cause the processor to be configured to determine the estimated travel path:
based on a shortest estimated time for the emergency vehicle to travel from the current location to the destination;
based on a minimum quantity of traffic lights passed by the emergency vehicle to travel from the current location to the destination; or
based on a least amount of vehicular traffic from the current location to the destination.

20. The center service unit of claim 17, wherein the first and second moments are determined based on traffic information, and wherein the instructions further cause the processor to be configured to update the first moment and the second moment responsive to a change in the traffic information.

* * * * *